June 9, 1942.     H. AUSLANDER     2,285,791

PULLEY DEVICE

Filed Feb. 1, 1941

INVENTOR
Henry Auslander
BY
ATTORNEY

Patented June 9, 1942

2,285,791

UNITED STATES PATENT OFFICE 2,285,791

PULLEY DEVICE

Henry Auslander, Brooklyn, N. Y.

Application February 1, 1941, Serial No. 376,938

1 Claim. (Cl. 254—192)

This invention relates to new and useful improvements in a pulley device.

More specifically, the invention proposes the construction of a pulley device characterized by a housing enclosing the pulley of the device which is supported by a pintle mounted across the sides of the housing in a manner to completely enclose said pulley.

Still further it is proposed to provide the pulley device with a longitudinal strip of metal having a central bent portion forming a handle, and arm portions extending into the housing through openings formed therein and provided with bearing openings through which the pintle passes in a manner to assist the housing in rotatively supporting the pulley.

Heretofore, pulley devices have been constructed in which the pulley is enclosed within a housing. However, the objectionable feature of these prior constructions is the fact that the pulley is supported within the housing and the housing in turn supported by the handle portion connected to the outside thereof, necessitating that the housing act to connect the pintle supporting the pulley with the handle portion, in addition to enclosing the pulley against the deteriorating effects of inclement weather. In these prior constructions the pintle was only supported by the side walls of the housing, and due to exposure the openings through which the pintle passed rusted and enlarged by continuous pressure thereon causing the pintle to be disconnected from the housing destroying the operativeness of the device. In the present construction these defects have been overcome by having the ends of the bearing dually supported by the ends of the arms as well as the side walls of the housing.

Still further the invention proposes that the pintle supporting the bearing be attached to the ends of the arms of the handle portion so as to eliminate stresses upon the housing and to cause the housing to serve only as a cover for the pulley device and its connection with the handle portion to prevent the exposure of these parts to inclement weather.

Still further it is proposed to provide the ends of the arms supporting the pintle of the pulley with offset portions in a manner to locate the pulley centrally of the housing to prevent contact with the side walls thereof and eliminate the frictional contacting of these parts.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Figure 1:
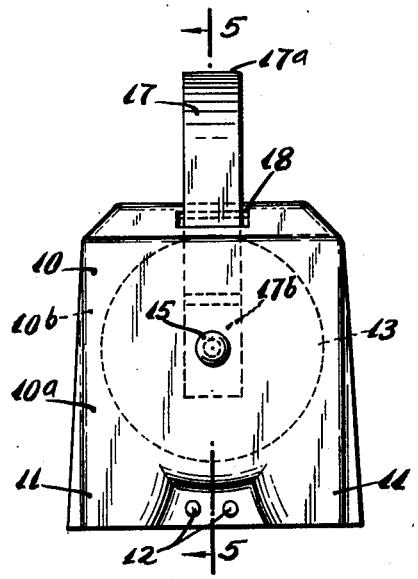
Fig. 1 is a side elevational view of a pulley device constructed in accordance with this invention.
Figure 2:
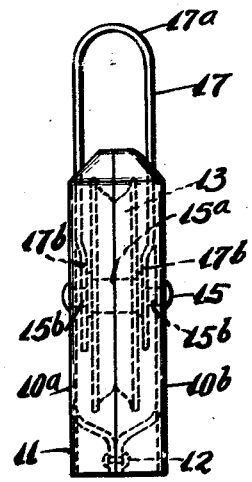
Fig. 2 is an end elevational view of Fig. 1.
Figure 3:
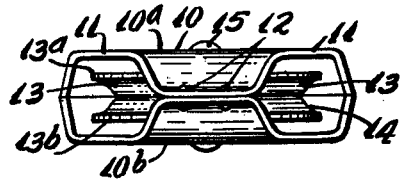
Fig. 3 is a bottom plan view of Fig. 1.
Figure 4:
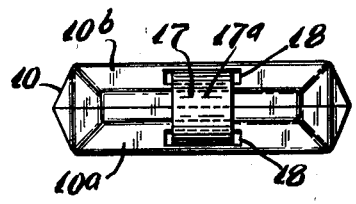
Fig. 4 is a top plan view of Fig. 1.

The pulley device, according to this invention, includes a housing 10 consisting of two similarly shaped sheet metal parts 10$^a$ and 10$^b$, each part being formed with tangentially disposed channels 11 at opposite sides thereof. These channels, when the parts 10$^a$ and 10$^b$ of the housing 10 are brought together, normally form tubular openings through which a rope for engaging over the pulley normally passes. The material from which the sheet metal parts 10$^a$ and 10$^b$ are formed have their central portions located between the channels 11 bent inwards so as to contact each other as shown in Figs. 3 and 4. Rivets 12 are engaged through these contacting portions for holding the housing parts together as a unit.

Figure 5:
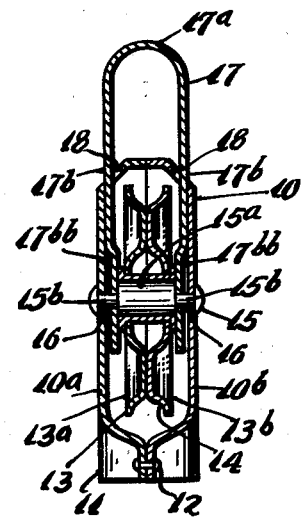
Fig. 5 is a vertical sectional view taken on the line 5—5 of Fig. 1.

A pulley 13 is located within the housing 10 and consists of separate sections 13$^a$ and 13$^b$ which are spot welded together to form a unit, and has a peripheral groove 14 over which a rope normally passes. The pulley 13 is provided with a hub portion extending transversely therethrough. The hub member has integrally formed bearing flanges at each end thereof which extend radially outwardly as is clearly shown in Figure 5 of the drawing. This pulley 13 is supported by means of a pintle 15 having an enlarged central portion 15$^a$ upon which the pulley 13 is located. The pintle then continues at its ends into reduced end portions 15$^b$ which are adapted to be passed through openings 16 formed in the sides of the housing as shown in Fig. 5. These ends 15$^b$ are then adapted to be milled over for connecting the pintle to the side walls of the housing 10.

A strip of metal 17 having a bent central portion 17$^a$ forms a handle portion for the pulley device. This handle portion is adapted to be engaged upon a hook or other supporting element outside of a window for supporting the pulley device so that a rope may be engaged over the pulley 13 thereof. This strip of metal 17 then has arm portions 17ᵇ which extend through openings 18 formed in the housing 10 on the side opposed to the side provided with the channels 11. The free ends of the arm portions 17ᵇ are provided with bearing openings through which the reduced ends 15ᵇ of the pintle 15 pass. The ends of the arms 17ᵇ are also provided with inwardly directed offset portions 17ᵇᵇ which contact the ends of the enlarged portion 15ᵃ of the pintle 15 for holding the pulley 13 centrally located upon this enlarged portion to prevent the pulley from moving laterally thereon to contact and rub against the side walls of the housing.

The central bent portion 17ᵃ of the strip of metal 17 is adapted to be engaged over a hook for supporting the pulley device and the arrangement is such that the strip of metal 17 is directly connected with the reduced end portions 15ᵇ of the pintle for providing a dual support for each of the reduced ends of the pintle. This construction causes the strip of metal to bear all stresses upon the pulley device leaving the housing free to perform the one function of encasing the pulley as well as its bearing supports upon the strip of metal 17 to prevent the exposure of these bearing portions to the deteriorating effects of inclement weather and greatly increase the normal life of such pulley.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In a pulley device of the type described having a sheet metal housing enclosing the pulley of said device, said pulley being provided with a hub member having integrally formed and radially outwardly extending bearing flanges adapted to engage a portion of each side wall of said pulley, said pulley being mounted upon a pintle extending across the sides of said housing, said pintle being provided with end portions projecting beyond said flanges, said end portions being substantially reduced in diameter, a strip of metal having a central bent portion forming a handle portion for said device having arm portions continuing from said bent portion and extending through openings in said housing and into the interior thereof, said arm portions being in surface to surface contact with the inner side walls of said housing for at least a portion of their length and having bearing openings through which said reduced end portions of said pintle pass, said arms being formed with offset portions at a point substantially adjacent the hub of said pulley, said offset portions being adapted to bear against the outer surfaces of said bearing flanges to maintain said pulley in a central position with respect to said pintle and said housing.

HENRY AUSLANDER.